United States Patent [19]

Kopetz

[11] Patent Number: 4,866,606
[45] Date of Patent: Sep. 12, 1989

[54] LOOSELY COUPLED DISTRIBUTED COMPUTER SYSTEM WITH NODE SYNCHRONIZATION FOR PRECISION IN REAL TIME APPLICATIONS

[75] Inventor: Hermann Kopetz, Vienna, Austria

[73] Assignee: Austria Miktosystem International GmbH, Linz, Austria

[21] Appl. No.: 65,891

[22] Filed: Jun. 24, 1987

Related U.S. Application Data

[63] Continuation-in-part of Ser. No. 747,014, Jun. 20, 1985, abandoned.

[30] Foreign Application Priority Data

Jun. 22, 1984 [AT] Austria ................................. 2030/84

[51] Int. Cl.[4] ................................................ G06F 9/00
[52] U.S. Cl. ..................................................... 364/200
[58] Field of Search .............................. 364/900, 200

[56] References Cited

PUBLICATIONS

AMI Publication Jun. 1986 Clock Synchronization Unit.
J. H. Wensley, et al., 'SIFT: The Design and Analysis of a Fault Tolerant System for Aircraft Control', vol. 66, No. 10, pp. 1240–1255, Oct. 1978.
Shin, K. G., Krishna, C. M., Synchronization and Fault Masking in Redundant Real-Time Systems, Proc. FTCS 14, Kissimee, Fla., pp. 152–157.
Page 637 from the book: "Lexikon der Datenverarbeitung", Lobel, Muller, Schmidt.

Primary Examiner—Thomas M. Heckler
Assistant Examiner—John G. Mills
Attorney, Agent, or Firm—Helfgott & Karas

[57] ABSTRACT

A loosely coupled distributed computer system provided with node synchronization for precision in real time applications includes a number of loosely coupled node computers. Each computer includes a local real time clock, I/O subsystems, and a communication unit. The computers are connected to each other by a transmission medium for serial communication. Each computer contains a synchronization unit for synchronization of the local real time clocks in each of the computer nodes with the real time clocks of other nodes. Each synchronization unit is connected with a digital output line of its associated local real time clock for supply of unsynchronized time signals from the digital output line to a digital input of the synchronization unit. The latter also has a digital output supplying global synchronized time signals to digital inputs of other I/O subsystems and is operatively connected with the communication unit for obtaining therefrom information as to the point of time of sending a message. The synchronization unit generates global synchronized time signals on its digital output line as a function of the time of an information from a sender and the arrival time information of other computer systems.

3 Claims, 2 Drawing Sheets

LOOSELY COUPLED DISTRIBUTED COMPUTER SYSTEM WITH NODE SYNCHRONIZATION FOR PRECISION IN REAL TIME APPLICATIONS

REFERENCE TO PRIOR APPLICATION

The present application is a continuation-in-part of my U.S. patent application No. 747 014 filed June 20, 1985, now abandoned.

BACKGROUND OF THE INVENTION

1. Field of the Invention

This invention relates to a loosely coupled distributed computer system for real time applications consisting of a communication medium for serial communication and a number of node computers with a local real time clock in each node computer.

2. Description of the Prior Art

A distributed computer system consists of a number of autonomous computers (nodes) which are loosely connected by a communication subsystem (Local Area Network=LAN). Such a loose connection is characterized by the fact that only serial messages are exchanged between the nodes. Such message is a sequence of bytes (typical in the range of ten to many hundred bytes) treated as an atomic unit. There is enough redundancy within a message (error detecting codes, e.g. CRC) that a change of the content of a message resulting from a transmission error can be detected with a sufficient high probability. It is therefore justified to assume that a message arrives either with correct content or not at all (an erroneous message is simply discarded). According to the state of the art every node of a distributed real time system contains its own local real time clock. The accuracy of these clock is predominantly determined by the accuracy of the local quartz crystal, i.e. the relative error is in the order of 1 ppm. A real time application, i.e. a real time process which is controlled by a distributed real time system, requires the synchronization of the local real time clocks of each node. The synchronized time will be called the approximate global time or global time for short. The accuracy of this synchronization determines the units of time, which can be measured by this system. In a distributed real time system this synchronization can be realized by the exchange of messages (it is then unnecessary to implement separate channels for the synchronization of the clocks). The synchronization procedure should be fault tolerant i.e. a faulty clock or a missing message should be tolerated.

Algorithms useful for carrying out the process of the invention for the fault tolerant synchronization of real time clocks have been published. For example, a prototype utilizing one such known algorithm for a highly reliable real time system has been built and is described in the research project SIFT (J. H. Wensley, et al, SIFT (Software Implemented Fault Tolerance): The Design and Analysis of a Fault Tolerant System for Aircraft Control, Proceeding of the IEEE Vol. 66, No. 10, p. 1240–1255, October 1978). A minicomputer, which was available in the open market, was chosen for the node of the system. The synchronization algorithm therein disclosed is executed in the (single) CPU of this node, in parallel to the application software.

For further details, reference should be made to the SIFT publication, the disclosure of which is incorporated by reference. A copy of the SIFT publication has been filed and is of record in the parent U.S. patent application No. 747 014.

The algorithm is carried out in two parts. In the first part, each clock computes a vector of clock values, called the interactive consistency vector, having an entry for every clock. In the second part, each clock uses the interactive consistency vector to compute its new value. A clock p computes its interactive consistency vector as follows. The entry of the vector corresponding to p itself is set equal to p's own clock value. The value for the entry corresponding to another processor q is obtained by p as follows.

(1) Read q's value from q.

(2) Obtain from each other clock r the value of q that r read from q.

(3) If a majority of these values agree, then the majority value is used. Otherwise, the default value NIL (indicating that q is faulty) is used.

One can show that if in a set of four clocks at most one of the clocks is faulty, then (1) each nonfaulty clock computes exactly the same interactive consistency vector; and (2) the component of this vector corresponding to any nonfaulty clock q is q's actual value.

Having computed the interactive consistency vector, each clock computes its new value as follows. Let $\delta$ be the maximum amount by which the values of nonfaulty processors may disagree. (The value of $\delta$ is known in advance, and depends upon the synchronization interval and the rate of clock drift.) Any component that is not within $\delta$ of at least two other components is ignored, and any NIL component is ignored. The clock then takes the median value of the remaining components as its new value.

The difference between this median value and the value of the local real time clock gives the state correction term for this clock. This state correction term is written into the appropriate register of the synchronization unit which then performs the synchronization as explained more below. Each SIFT processor reads the value of its own clock directly, and reads the value of another processor's clock over a bus. It obtains the value that processor r reads for processor q's clock by reading from processor r's memory over a bus.

Since publication in 1978 of the described known algorithm, a number of other algorithms have been developed which may be used for purpose of the present invention, notably those disclosed in U.S. Pat. Nos. 4,531,185 and 4,584,643, the disclosures of which are incorporated by reference.

Also a survey of useful algorithms is disclosed in Proceedings of the Advanced Seminar on Real Time Local Area Network in an article by F. Schneider entitled "A Paradigm for Reliable Clock Synchronization" (INRIA, Rocquencourt, France, 1986). The algorithms disclosed in this publication can be calculated either in the CPU and/or in the synchronization unit.

Leading to the present invention was the realization that:

(1) The processer load of the fault tolerant synchronization algorithm increases significantly with the number of the nodes and the number of the tolerated faults. It has been shown (Shin, K. G., Krishna, C. M., Synchronization and Fault Masking in Redundant Real-time Systems, Proc. FTCS 14, Kissimee, Fla., p. 152–157) that this processing load approaches the processing capacity of modern microcomputers.

(2) In a distributed system which is synchronized by the exchange of messages, the inaccuracies of the measurements of the points in time of sending and receiving a message are the determining factors for the achievable accuracy of synchronization.

SUMMARY OF THE INVENTION

It is an object of this invention to improve the accuracy of synchronization of the local real time clocks in a distributed real time system. As already mentioned, the main reason for the inaccuracy of synchronization is the inaccuracy of measurement of the point in time of sending and receiving a message.

This inaccuracy is determined by (1) The duration of the time interval between two ticks of the local real time clock.

(2) The often unknown delay between the point in time of handling a message to the local communication subsystem of the node and the point in time of actually putting the message on the communication medium (i.e. the unknown delay until the node gains access to the medium).

(3) The often unknown delay between the point in time of arrival of the message in the local communication subsystem of the receiver and the point in time of bringing this arrival of the message to the attention of the receiving CPU (i.e. the CPU has to finish the current work).

(4) The duration of the cycle between two synchronizations.

The transmission time of the message on the medium is given by the known speed of transmission and the length of the medium and can be calculated and corrected.

This invention solves the stated problem in a loosely coupled distributed computer system for real time applications, comprising a plurality of loosely coupled node computers each including a local real time clock, I/O subsystems, and a communication unit, said node computers being interconnected by a transmission medium for serial communication therebetween, the improvement consisting in that each node computer contains a synchronization unit for synchronization of the local real time clocks in each of the computer nodes with the real time clocks of other nodes, said synchronization unit, to this end, being connected with a digital output line of its associated local real time clock for supply of unsynchronized time signals from said digital output line to a digital input of said synchronization unit, said synchronization unit having a digital output supplying global synchronized time signals to digital inputs of other I/O subsystems and being operatively connected with said communication unit for obtaining therefrom information as to the point in time of sending a message, measured in the metric of the local real time clock of the sender and contained in the message, and the point in time of arrival of the message, said synchronization unit generating said global synchronized time signals on its digital output line as a function of "send" and "arrival" time information of other computer nodes and the local unsynchronized time signals supplied to its digital input by its associated local real time clock, said synchronized time signals on said digital output line of said synchronization unit applying a known synchronization algorithm.

The direct connection between the synchronization unit and the communication unit consists of a signalline from a digital output of the communication unit to a digital input of the synchronization unit and a common bus.

BRIEF DESCRIPTION OF THE DRAWING

This invention will be explained in more detail by referring to the enclosed figures, wherein.

Figure 1:
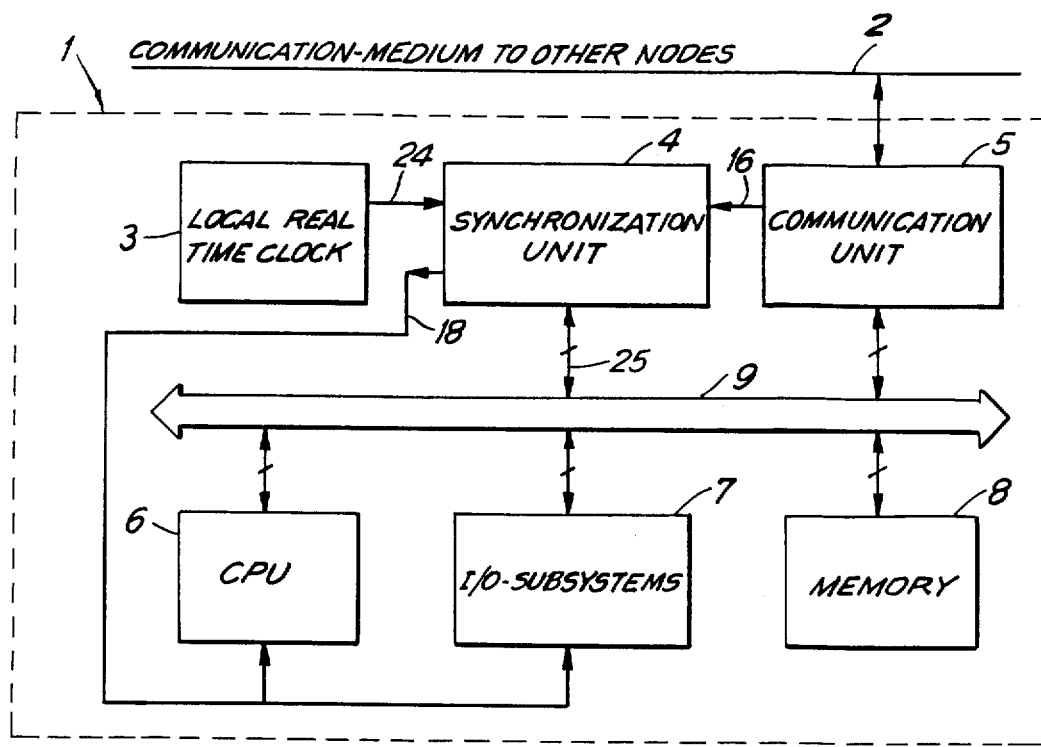
FIG. 1 shows a node computer in a block diagram and FIG. 2 a synchronization unit in more detail.

According to FIG. 1 a node computer 1 is coupled to a communication medium 2. The node computer contains a local real time clock 3, a synchronization unit 4, a communication unit 5, a CPU 6, I/O-subsystems 7, a memory 8 and a bus system 9.

The synchronization unit can be implemented with a singlechip microcomputer (e.g. Intel 8051) which has a short interrupt response time. If a more accurate synchronization is required, it is necessary to implement the synchronization unit with discrete TTL components or a custom designed VLSI chip. The algorithm for synchronization, above described, will be executed in the synchronization unit in cooperation with the CPU of the node.

Figure 2:
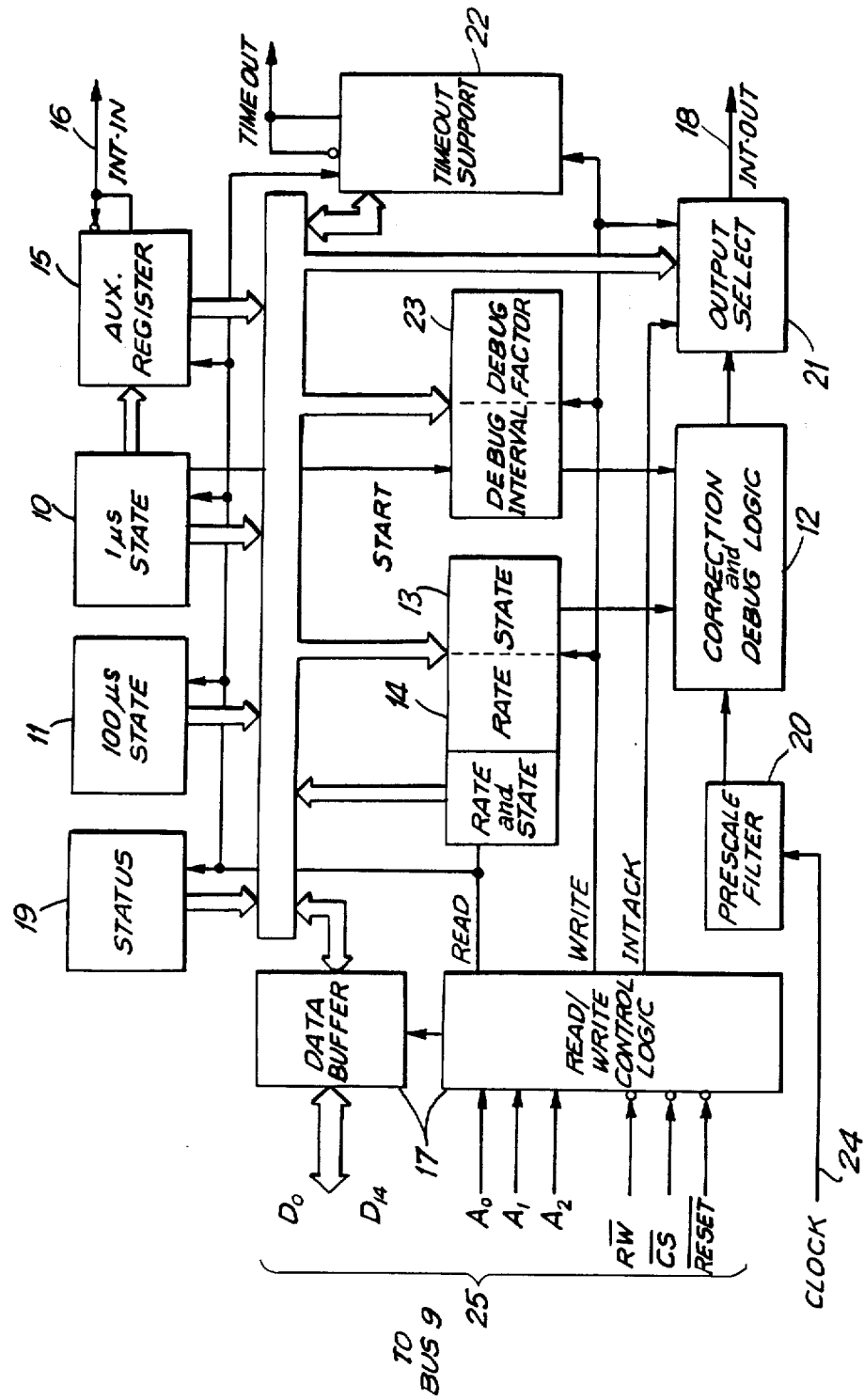

An example of a custom designed VLSI implementation of the synchronization unit is presented in FIG. 2 and explained in more detail thereafter.

It is the objective of the Synchronization Unit (CSU) to improve the synchronization accuracy and to reduce the load on the CPU for clock synchronization.

The clock synchronization unit (CSU) illustrated in FIG. 2 includes components for performing the following functions:

(1) It provides a register 10 for the local real time tl with a granularity (resolution, interval between two consecutive ticks) of 1 $\mu$s.

(2) It provides a register 11 for the global time tg with a granularity of 100 $\mu$s.

(3) It contains the correction logic 12 for the continuous correction of the state 13 and the rate 14 of the local and global time base. The correction term can be set in the range from 100 nsec to 10 msec. The large correction term is needed for initialization of the CSU. The correction logic works as follows. The state and rate correction for a given resynchronization interval are added. The duration of the time intervals between two ticks is shortened or lengthened by a very small fraction until the required correction has been performed.

(4) It contains a DMA compatible interface 17 such that the CSU registers can be accessed with a memory fetch operation. This facility is used to write into outgoing message the precise point in time of sending the message in the metric of the local real time of the sender after the media access to a Local Area network (LAN) has been granted.

(5) It contains a sample and hold register 15 for the accurate measurement of the point in time of arrival of an incoming message. The arrival event is signaled to the synchronization unit by signal line 16 from the communication unit 5 (see FIG. 1).

(6) It generates a periodic interrupt signal on output line 18 after a programmable period.

During internal synchronization, a message containing the local time of the sender is broadcast on a LAN. A receiving node calculates the correction factor according to and writes the correction term into the state correction register 13 of the CSU. The CSU then corrects the clock continuously during the next resynchronization interval.

The rate register of the CSU is used to correct systematic rate errors of the individual clock, e.g. rate errors caused by mechanical imprecision of the quartz crystal.

This example of a synchronization unit contains 8 specific read/write registers which can be selected by three address lines. The rate and state correction term can be stored into the appropriate CSU register 13, 14 by a single write operation. The dynamic (range) of the correction mechanism is $2^{15}$-1. The custom designed VLSI-chip, which is manufactured by a double metal 2 μm CMOS process, can be used as a CPU clocking co-processor in DMA driven system.

The status register 19 contains information about the current status of the synchronization unit. A prescale filter 20 is used for the adaption of the input clock frequency. The output select unit 21 determines the period of the globally synchronized time on line 18.

Additional elements which are not part of the present invention are the time out support 22 and a debug facility 23.

For additional details reference should be made to AMI Publication S65C60 of June 1986, copy of which has been filed with the application and the disclosure of which is incorporated herein by reference.

The realization of this autonomous synchronization unit 4 makes it possible to increase the cycle time of the local real time clock of the node and thus reduce the inaccuracy of time measurement while at the same time decreasing the load on the central CPU. From the point of view of software this synchronization unit leads to a separation of concerns and thus a reduction of software complexity.

The placement of the synchronization unit 4 on the node computer 1 is shown in FIG. 1. The digital output of the local real time clock 3 is connected with a digital input of the synchronization unit 4 via line 24. The globally synchronized time signals produced at a digital output line of the synchronization unit, can be used to control the activities of the other subsystems via line 18. The synchronization unit 4 is also connected with the bus 9 to the other subsystems on the node via line 25.

In addition to these connections a signal line 16 between the communication unit 5 and the synchronization unit 4 is provided to report the point in time of arrival of a message such that the arrival time can be recorded without delay. A second signal line can be made available to report to the synchronization unit 4 that the communication unit has gained access to the communication medium 2 such that the actual time of sending the message can be written into the message during sending. If the access strategy to the communication medium is TDMA, this second line is not needed.

I claim:

1. In a loosely coupled distributed computer system for real time applications, comprising a plurality of loosely coupled node computers each including a local real time clock, I/O subsystems, and a communication unit, said node computers being interconnected by a transmission medium for serial communication therebetween, the improvement comprising each node computer including a synchronization unit for synchronization of the local real time clocks in each of the computer nodes with the real time clocks of other nodes, each synchronization unit being connected with a digital output line of a local real time clock associated therewith for supply of unsynchronized time signals from said digital output line to a digital input of said synchronization unit, said synchronization unit having a digital output supplying global synchronized time signals to digital inputs of other I/O subsystems and being operatively connected with said communication unit for obtaining therefrom a first information as to a point in time of sending a message to said communication unit, said message being measured in a metric of the local real time clock of a sender, and a second information as to a point in time of arrival of the message in a metric of the local real time clock of a receiver, said synchronization unit generating said global synchronized time signals on the digital output line thereof as a function of said first and second information of other computer nodes and the local unsynchronized time signals supplied to the digital input thereof by an associated local real time clock of the synchronization unit, said synchronized time signals on said digital output line of said synchronization unit applying a known synchronization algorithm.

2. The computer system of claim 1, wherein the synchronization unit and the communication unit are both connected to a common bus and are interconnected with one another by a connecting line from a digital output of the communication unit to said digital input of the synchronization unit.

3. The computer system of claim 2, wherein the computer nodes each include a CPU, said synchronization unit providing said known synchronization algorithm in cooperation with said CPU of each computer node.

* * * * *